(12) United States Patent
Lee et al.

(10) Patent No.: US 7,664,492 B1
(45) Date of Patent: Feb. 16, 2010

(54) NETWORK ENGINEERING IN A WIRELESS NETWORK

(75) Inventors: William C. Y. Lee, Danville, CA (US); Jau Young Lee, Pleasanton, CA (US)

(73) Assignee: Cellco Partnership, Bedminster, NJ (US)

(*) Notice: Subject to any disclaimer, the term of this patent is extended or adjusted under 35 U.S.C. 154(b) by 2139 days.

(21) Appl. No.: 09/625,626

(22) Filed: Jul. 26, 2000

Related U.S. Application Data

(60) Provisional application No. 60/145,727, filed on Jul. 27, 1999.

(51) Int. Cl.
  *H04W 24/00* (2009.01)
(52) U.S. Cl. .............. 455/424; 455/422.1; 455/436; 455/67.11; 455/423; 455/562.1; 455/446; 455/456.1
(58) Field of Classification Search ........ 455/423–425, 455/436, 442, 446, 456.5, 12.1, 456.1–2, 455/439, 67.11; 343/702; 342/367, 357.1; 379/32.01; 375/347; 370/331
See application file for complete search history.

(56) References Cited

U.S. PATENT DOCUMENTS

| | | | | |
|---|---|---|---|---|
| 5,095,500 A * | 3/1992 | Tayloe et al. | ............ | 379/32.01 |
| 5,134,709 A * | 7/1992 | Bi et al. | ............ | 455/452.2 |
| 5,175,867 A * | 12/1992 | Wejke et al. | ............ | 455/439 |
| 5,179,722 A * | 1/1993 | Gunmar et al. | ............ | 455/446 |
| 5,241,685 A * | 8/1993 | Bodin et al. | ............ | 455/453 |
| 5,285,494 A * | 2/1994 | Sprecher et al. | ............ | 455/423 |
| 5,303,240 A * | 4/1994 | Borras et al. | ............ | 370/347 |
| 5,422,933 A * | 6/1995 | Barnett et al. | ............ | 455/439 |
| 5,479,482 A * | 12/1995 | Grimes | ............ | 455/556.1 |
| 5,490,285 A * | 2/1996 | Ahlenius et al. | ............ | 455/446 |
| 5,561,841 A * | 10/1996 | Markus | ............ | 455/446 |
| 5,640,677 A * | 6/1997 | Karlsson | ............ | 455/434 |
| 5,640,678 A * | 6/1997 | Ishikawa et al. | ............ | 455/449 |
| 5,726,979 A * | 3/1998 | Henderson et al. | ............ | 370/254 |
| 5,727,057 A * | 3/1998 | Emery et al. | ............ | 379/201.07 |
| 5,758,264 A * | 5/1998 | Bonta et al. | ............ | 455/67.7 |
| 5,818,385 A * | 10/1998 | Bartholomew | ............ | 342/372 |
| 5,890,067 A * | 3/1999 | Chang et al. | ............ | 455/446 |
| 5,890,068 A * | 3/1999 | Fattouche et al. | ............ | 455/456.2 |
| 5,973,643 A * | 10/1999 | Hawkes et al. | ............ | 342/457 |
| 5,983,109 A * | 11/1999 | Montoya | ............ | 455/456.2 |
| 6,047,178 A * | 4/2000 | Frlan | ............ | 455/423 |
| 6,078,817 A * | 6/2000 | Rahman | ............ | 455/452.1 |
| 6,091,788 A * | 7/2000 | Keskitalo et al. | ............ | 375/347 |
| 6,097,957 A * | 8/2000 | Bonta et al. | ............ | 455/446 |
| 6,115,762 A * | 9/2000 | Bell et al. | ............ | 710/62 |
| 6,141,565 A * | 10/2000 | Feuerstein et al. | ............ | 455/560 |

(Continued)

*Primary Examiner*—Sharad Rampuria
(74) *Attorney, Agent, or Firm*—Gates & Cooper LLP

(57) ABSTRACT

A and collects provides various types of information therefrom, including E911 location information, Hand Off (HO) information, and Power information, as well as other Measurements and System Parameters. This information is analyzed by a Data Collection and Filtering system and the results of this analysis are provided to a Network Control system to dynamically control the operation of the wireless network. The various optimizations that can be achieved include: (1) dynamically allocating radio frequency (RF) signal power in the wireless network, (2) setting dynamic dedicated handoff (HO) thresholds for individual mobile transceivers; and (3) intelligently forming or steering radio frequency (RF) signal beams. Moreover, the collected and analyzed information can be used to identify and resolve problems in the wireless network, especially when the identified problems are correlating with E911 location information.

24 Claims, 9 Drawing Sheets

U.S. PATENT DOCUMENTS

| | | |
|---|---|---|
| 6,169,910 B1 * | 1/2001 | Tamil et al. .............. 455/562.1 |
| 6,363,263 B1 * | 3/2002 | Reudink et al. .......... 455/562.1 |
| 6,400,943 B1 * | 6/2002 | Montoya .................... 455/423 |
| 6,434,390 B2 * | 8/2002 | Rahman ..................... 455/440 |
| 6,445,917 B1 * | 9/2002 | Bark et al. ................. 455/423 |
| 6,512,481 B1 * | 1/2003 | Velazquez et al. ........... 342/367 |
| 6,915,139 B2 * | 7/2005 | Hamabe ..................... 455/522 |
| 7,024,186 B1 * | 4/2006 | Ishikawa et al. ............ 455/423 |
| 7,042,858 B1 * | 5/2006 | Ma et al. .................... 370/331 |
| 7,139,575 B1 * | 11/2006 | Chen et al. .................. 455/437 |
| 7,567,807 B2 * | 7/2009 | Dunn et al. ................. 455/436 |
| 2001/0022558 A1 * | 9/2001 | Karr et al. .................. 342/450 |

* cited by examiner

US 7,664,492 B1

NETWORK ENGINEERING IN A WIRELESS NETWORK

CROSS REFERENCE TO RELATED APPLICATIONS

This application claims priority under 35 U.S.C. § 119(e) to U.S. Provisional Patent Application No. 60/145,727, filed Jul. 27, 1999, entitled "NETWORK ENGINEERING 2000" by William C. Y. Lee and David J. Y. Lee, which application is incorporated by reference herein.

This application is related to the following co-pending and commonly-assigned U.S. Patent Applications:

Ser. No. 09/590,346, filed Jun. 8, 2000, by David J. Y. Lee, Ce Xu, and William C. Y. Lee, entitled "MOBILE INTERNET PROTOCOL SQUARE,"; and Ser. No. 09/589,974, filed Jun. 8, 2000, by David J. Y. Lee, Ce Xu, and William C. Y. Lee, entitled "ARCHITECTURE OF INTERNET PROTOCOL-BASED CELLULAR NETWORKS,";

both of which applications are incorporated by reference herein.

BACKGROUND OF THE INVENTION

1. Field of the Invention

The present invention relates to cellular telephone systems, and, in particular, to network engineering in a wireless communications system.

2. Description of the Related Art

Location tracking is useful for emergency services. In 1996, the U.S. Federal Communications Commission (FCC) promulgated standards on how cellular emergency services should be implemented, which standards are known as the "E911" standards. According to the FCC, all cellular networks must have the capability to offer to emergency telephone operators information on the location of the user calling the emergency number. By April 1998, cellular networks were required to be able to indicate the nearest cell site to the caller and the caller's number. By the year 2001, cellular networks have to be able to track the location of the emergency caller with an accuracy of 400 feet (122 meters). See http://www.fcc.gov/e911.

The introduction of E911 location technology provides new options for network engineering and operations in wireless networks. Thus, there is a need in the art for improved techniques for using the E911 location technology.

SUMMARY OF THE INVENTION

To overcome the limitations in the prior art described above, and to overcome other limitations that will become apparent upon reading and understanding the present specification, the present invention discloses a communications system combines artificial intelligence with feedback loop through human interaction for educated intelligence, location (E911) and other mobile system related parameters and measured data to form a data collection, filtering and image comparison system that integrates with a wireless network and collects provides various types of information therefrom, including E911 location information, Hand Off (HO) information, and Power information, as well as other Measurements and System Parameters. This information is analyzed by a Data Collection and Filtering system through the image matching process and the results of this analysis are provided to a Network Control system to dynamically control the operation of the wireless network. The various optimizations that can be achieved include: (1) dynamically allocating radio frequency (RF) signal power in the wireless network, (2) setting dynamic dedicated handoff (HO) thresholds for individual mobile transceivers; and (3) intelligently forming or steering radio frequency (RF) signal beams. Moreover, the collected and analyzed information can be used to identify and resolve problems in the wireless network, especially when the identified problems are correlated with E911 location information.

BRIEF DESCRIPTION OF THE DRAWINGS

Referring now to the drawing in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The advancement of location technology makes it possible for a wireless network to identify the location of each mobile transceivers in the network with some degree of accuracy. Using this location information, the operation of the network can be optimized for better performance.

Operating Environment

Figure 1:
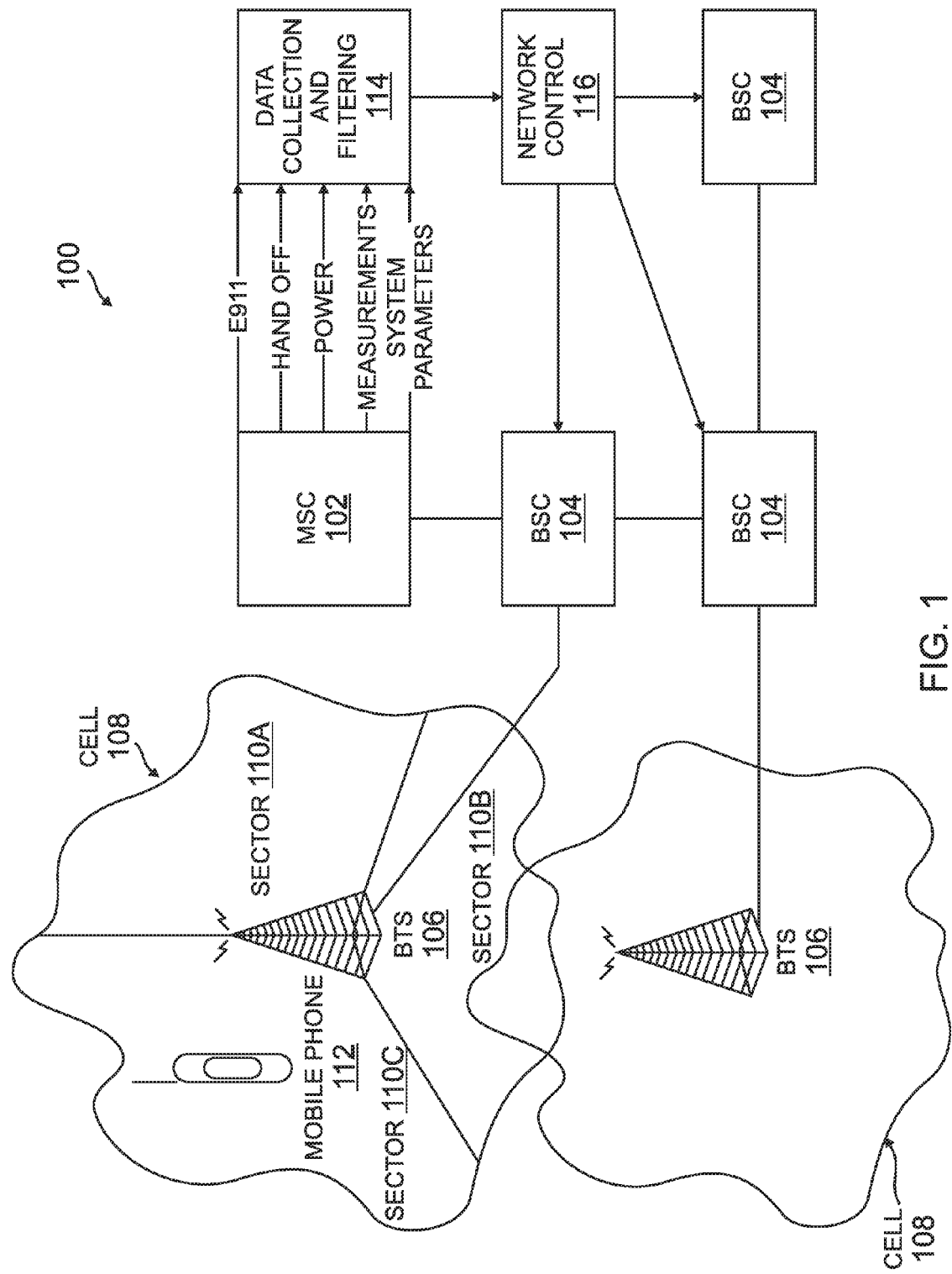
FIG. 1 illustrates a wireless network according to the preferred embodiment of the present invention.

FIG. 1 illustrates a wireless network 100 according to the preferred embodiment of the present invention. In the preferred embodiment, the network 100 comprises a cellular telephone system, although other wireless networks 100 could be used as well. Other wireless networks 100 that could benefit from the present invention include mobile data networks, wireless broadband networks, multi-channel multipoint distribution service (MMDS) networks, wireless personal area networks, wireless local area networks, and the like.

The network 100 includes at least one MSC (Mobile Switching Center) 102, at least one BSC (Base Station Controller) 104, at least one BTS (Base Transceiver Station) 106 (and associated antennae). The limits of RF signal coverage from the BTS 106 defines a perimeter of the associated cell site 108, which is often irregular in shape due to the shape of terrain and the presence of buildings and other structures. The BTS 106 may include omni-directional or directional antennae, wherein the directional antennae can be used to define sectors 110A-C within the cell site 108. Sectors 110A-C increase channel efficiency by permitting "soft" handoffs (SOHs) (i.e., no channel changes) for mobile transceivers 112 (e.g., mobile phones) that traverse between sectors 110A-C, rather than the "hard" handoffs (HOs) (i.e., channel changes) that occur when the mobile transceivers 112 traverse between cell sites 108.

In the present invention, the MSC 102 interfaces to a Data Collection and Filtering system 114, and provides various types of information thereto. This information may include, inter alia, E911 location information, (e.g., Latitude, Longitude, Height, Speed, Direction, etc.), Hand Off (HO) information (e.g., HO status, etc.), and Power information (e.g., Ec/Io=Energy per code bit/Intracell interference, Eb/Io=Energy per bit/Intracell interference, ERP=effective radiated power, path loss, fading, etc.), as well as other Measurements and System Parameters (e.g., peak data rate, throughput, delay, time of the day, noise floor, environmental characteristics, user density, average talk time, call blocking rate, etc.). This information is analyzed by the Data Collection and Filtering system 114 and the results of this analysis are provided to a Network Control system 116 to dynamically control the operation of the network 100. The various optimizations that can be achieved are described in more detail below.

Data Collection and Filtering System

Figure 2A:
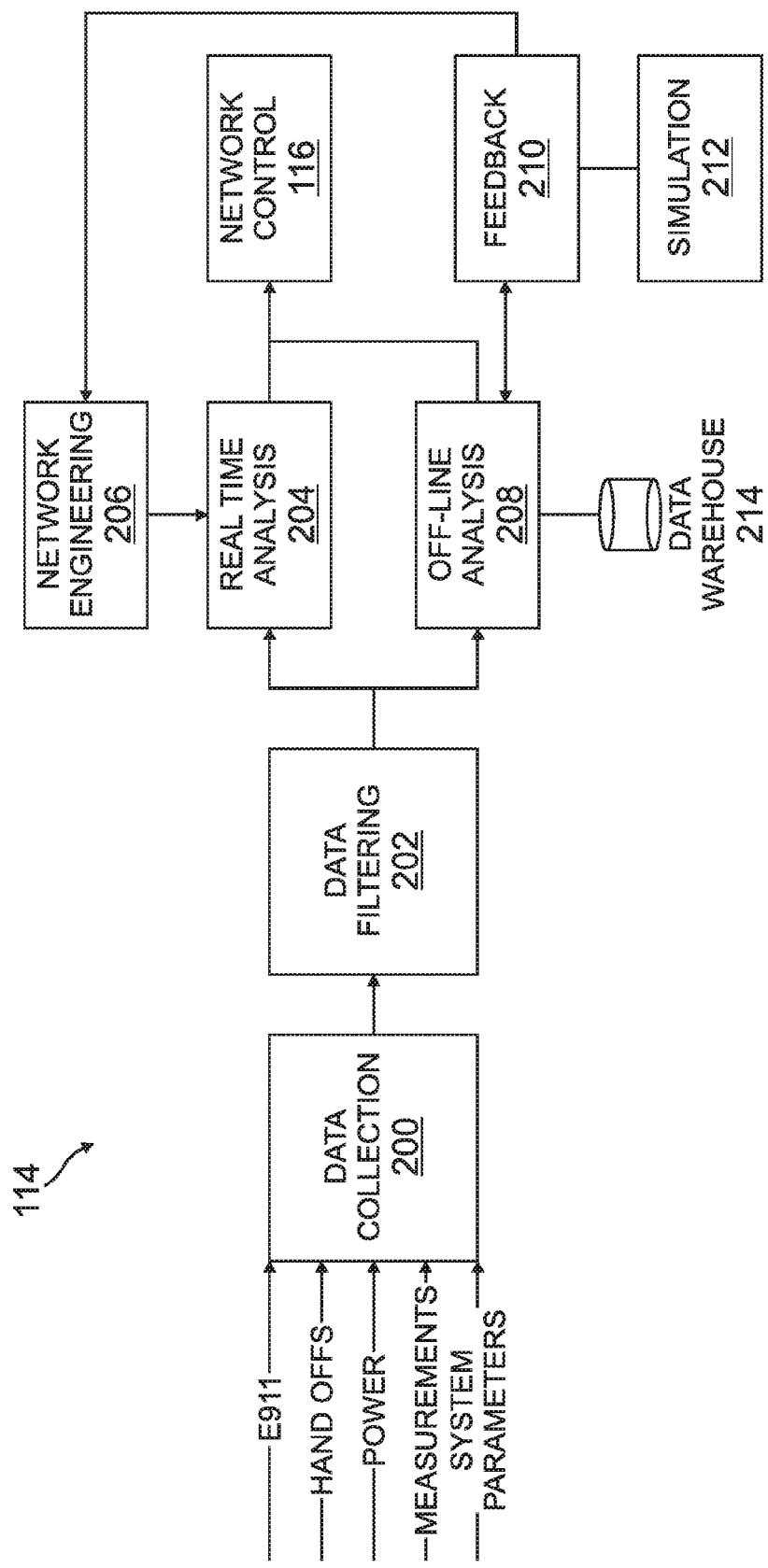
FIGS. 2A and 2B illustrate the Data Collection and Filtering system and its operation according to the preferred embodiment of the present invention.
Figure 2B:
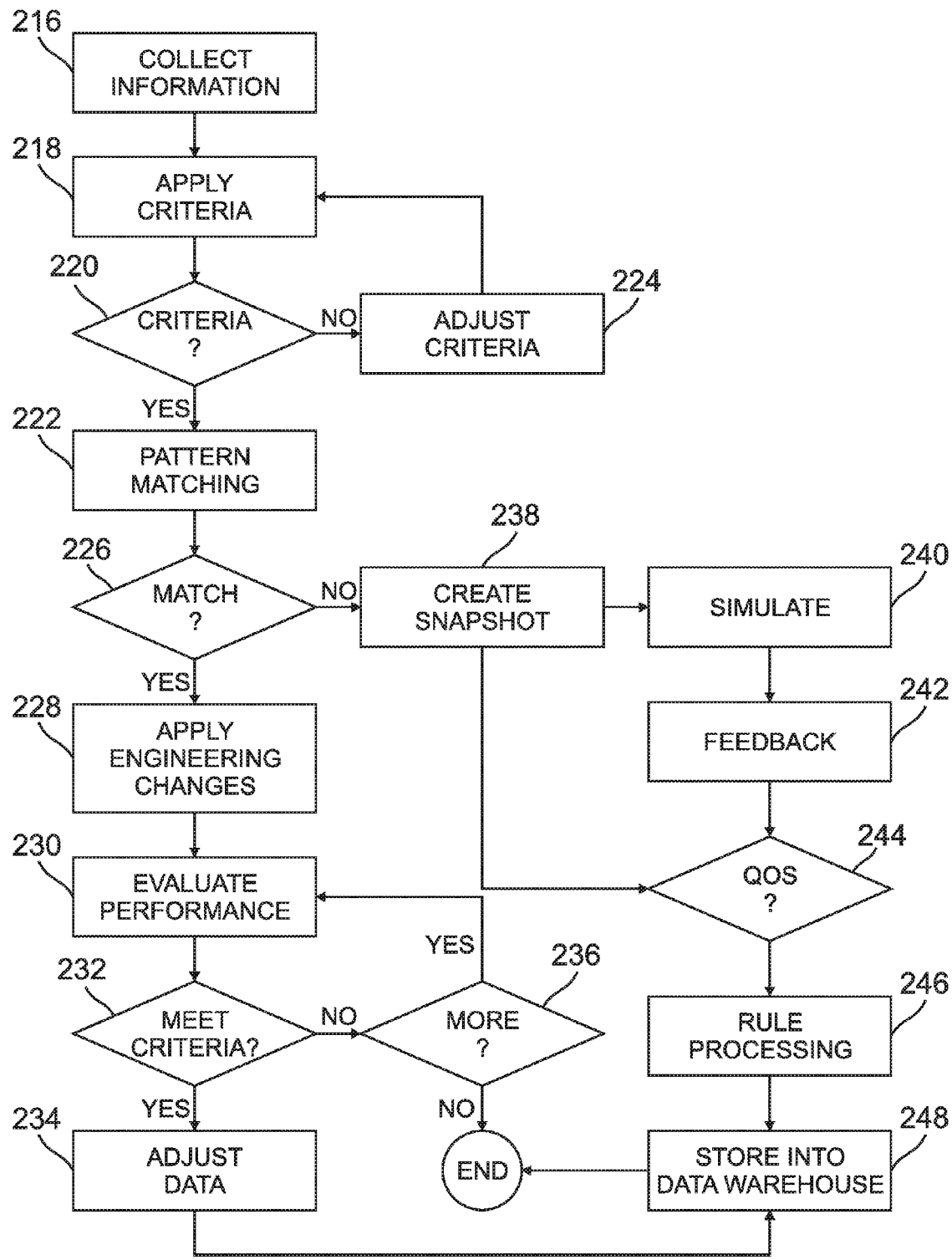

FIGS. 2A and 2B illustrate the Data Collection and Filtering system 114 and its operation according to the preferred embodiment of the present invention.

Referring to FIG. 2A, the Data Collection and Filtering system 114 in the preferred embodiment includes a data collection system 200 for collecting information from the network 100, a data filtering system 202 for filtering the information from the network 100, a real-time analysis system 204 for analyzing the information from the network 100 in real-time and for incorporating engineering changes from a network engineering system 206 into that analysis, an off-line analysis system 208 for use by engineers in analyzing the information from the network 100 in an off-line manner in conjunction with feedback 210 from a simulator 212 in order to generate appropriate solutions, and a data warehouse 214 for storing the collected information, as well as the results of the analysis of the information. The output from the real time analysis system 204 and/or off-line analysis system 206 can be provided to the Network Control system 116 for use in optimizing the operation of the network 100.

Referring to FIG. 2B, Block 216 represents the data collection system 200 collecting data, including E911 location information, Hand Off (HO) information, and Power information, as well as other signal Measurements and System Parameters.

Block 218 represents the data filtering system 202 filtering the data according to specified criteria, e.g., capturing the data when certain defined thresholds.

Block 220 is a decision block that represents the data filtering system 202 determining whether the filtered data meets certain defined thresholds. If so, control transfers to Block 222; otherwise, control transfers to Block 224, which adjusts the criteria, if necessary.

Block 222 represents the real time analysis system 204 applying pattern matching techniques to the captured data using rules or solutions developed from the analysis of prior trouble instances and the collected information related thereto.

Block 226 is a decision block that represents the real time analysis system 204 determining whether the captured data matches one or more patterns previously identified in the collected data. If so, control transfers to Block 228; otherwise, control transfers to Block 238.

Block 228 represents the real time analysis system 204 applying engineering changes to any solutions developed via the pattern matching techniques, wherein the engineering changes comprise additional rules or solution elements received from the network engineering system 206.

Block 230 represents the real time analysis system 204 evaluating the performance of the solutions developed via the pattern matching techniques and the network engineering system, wherein the performance is analyzed via the network engineering system 206 or via additional information collected by the data collection system 200.

Block 232 is a decision block that represents the real time analysis system 204 determining whether the evaluated performance matches one or more criteria previously identified in the collected data. If so, control transfers to Block 234, which may adjust the data before storing it into the data warehouse 214; otherwise, control transfers to Block 236.

Block 236 is a decision block that represents the real time analysis system 204 determining whether there is additional data available for the evaluation of the performance of the solutions developed via the pattern matching techniques and the network engineering system. If so, control transfers back to Block 230; otherwise, the logic terminates.

Block 238 represents the off-line analysis system 208 creating a "snapshot" from the collected and filtered information. In the preferred embodiment, such a snapshot includes all the available information described above, as well as an image or map that shows the location of the mobile transceivers 112 in the network 100.

Block 240 represents the simulation system 212 being used to simulate the operation of the network 100 using the snapshot from the collected and filtered information. This is generally performed off-line by network engineers. Such simulation allows engineers to crate alternative solutions to problem instances.

Block 242 represents the feedback system 212 being used to alter the simulation of the operation of the network 100 performed by the simulation system 210. Again, this is generally performed off-line by network engineers, and allows engineers to test their proposed solutions to problem instances, in conjunction with the simulation system 212.

Block 244 is a decision block that represents the off-line analysis system 208 determining whether the proposed solutions developed using the simulation system 212 and feedback system 212 provide the necessary level of QoS (Quality of Service). If so, control transfers to Block 246; otherwise, control transfers back to Block 238.

Block 242 represents the off-line system 208 being used to create a set of rules for altering the operation of the network 100 using the proposed solutions developed using the simulation system 212 and feedback system 212.

Block 244 represents the off-line system 208 saving the rules and the pattern represented by the snapshot of the collected and filtered information into the data warehouse 214. The saved patterns are used later by the real time analysis system 204 to identify known problem instances, and the saved rules are used later by the real time analysis system 204 to provide the necessary commands to the Network Control system 116.

Figure 3:
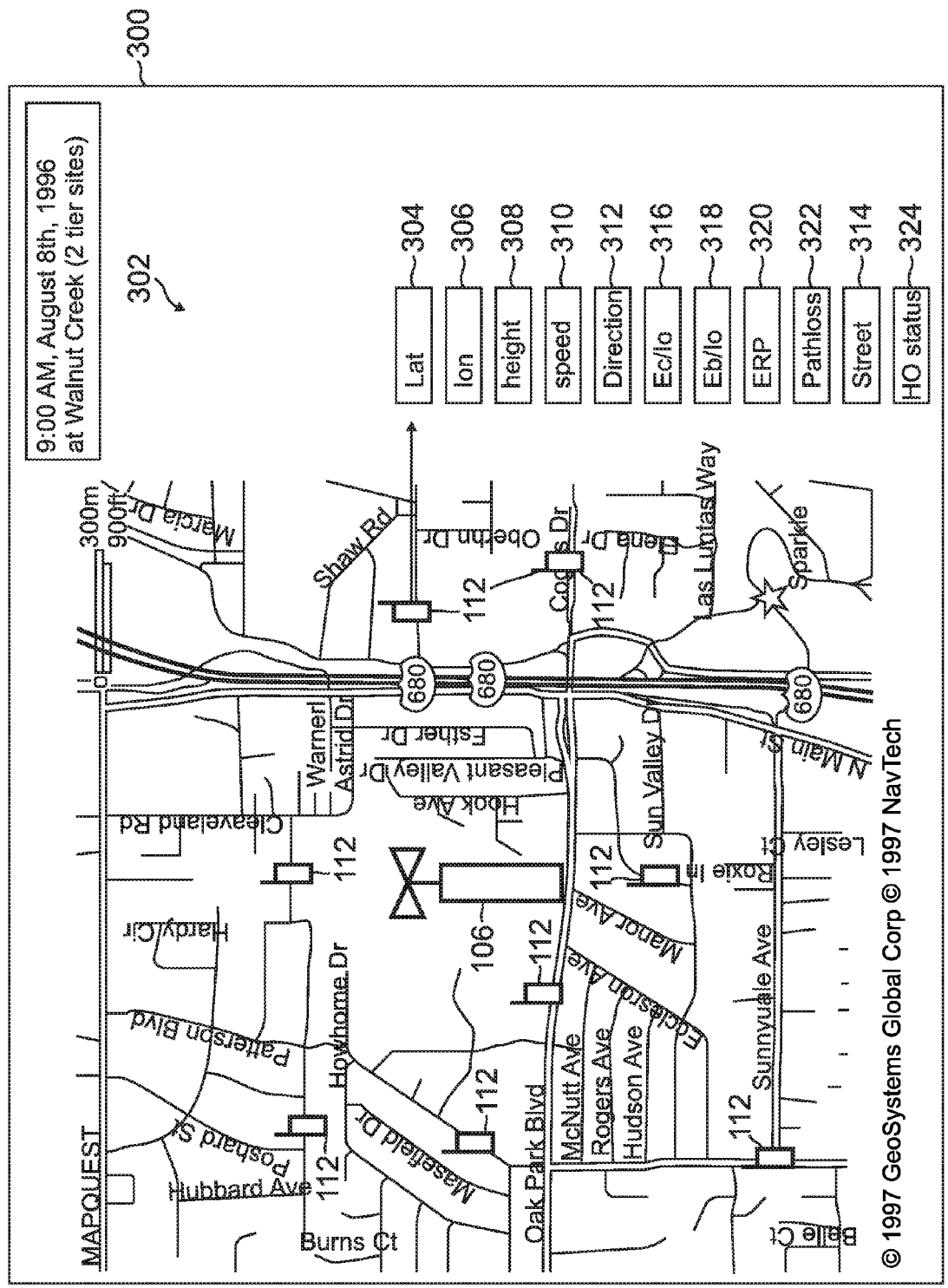
FIG. 3 illustrates one possible format for the collected information according to the preferred embodiment of the present invention.

FIG. 3 illustrates one possible format for the collected information according to the preferred embodiment of the present invention. These "snapshots" may comprise data from a graphical user interface (GUI) 300 of a network monitoring system, wherein the GUI 300 includes an image 302 correlated to the location information, the location information itself including Lat 304 (=latitude), Lon 306 (=longitude), Height 308, Speed 310, Direction 312, Street 314, Power information including Ec/Io 316 (=Energy per code bit/Intracell interference), Eb/Io 318 (=Energy per bit/Intracell interference), ERP 320 (=effective radiated power), Path loss 322, and HO (=handoff) status 324. Note that the image 302 includes iconic representations of the location of the BTS 106 and mobile transceivers 112 communicating with the BTS 106.

The collected information then can be manipulated by both the real time analysis system 204 and the off-line analysis system 206 to create a dynamic computer model for the network 100. This dynamic computer model is saved in the data warehouse 208, along with the captured information. Moreover, this dynamic computer model can be used to optimize the operation of the network 100.

As described in more detail below, the collected and analyzed information can be used by the Network Control system 116 to: (1) dynamically allocate radio frequency (RF) signal power in the network 100 based on the collected and analyzed information (i.e., dynamically assigning RF signal power to cells 108, sectors 110A-C within cells 108, and mobile transceivers 112 based on the collected and analyzed information), (2) set dynamic dedicated handoff (HO) thresholds for individual mobile transceivers 112 based on the collected and analyzed information (i.e., wherein the individual mobile transceivers 112 each have a unique, assigned HO (hand off) threshold), and (3) intelligently form radio frequency (RF) signal beams using the collected and analyzed information (i.e., steer an RF signal beam in the direction of one or more mobile transceivers 112 based on the collected and analyzed information).

Moreover, the collected and analyzed information can be used by the off-line analysis system 206 to identify and resolve problems. Specifically, this entails identifying problems in the network 100, and then correlating the identified problems with the collected and analyzed information, e.g., correlating the identified problems with mobile transceiver 112 location information from the collected and analyzed information.

Dynamic Power Allocation

One area of optimization provided by the present invention is dynamic power allocation. RF signal power from a single BTS 106, as well as RF signal power from multiple BTS's 106, e.g., throughout the whole network 100, can be dynamically allocated by the Network Control system 116 using the results of the analysis performed on the information provided to the Data Collection and Filtering system 114.

Figure 4A:
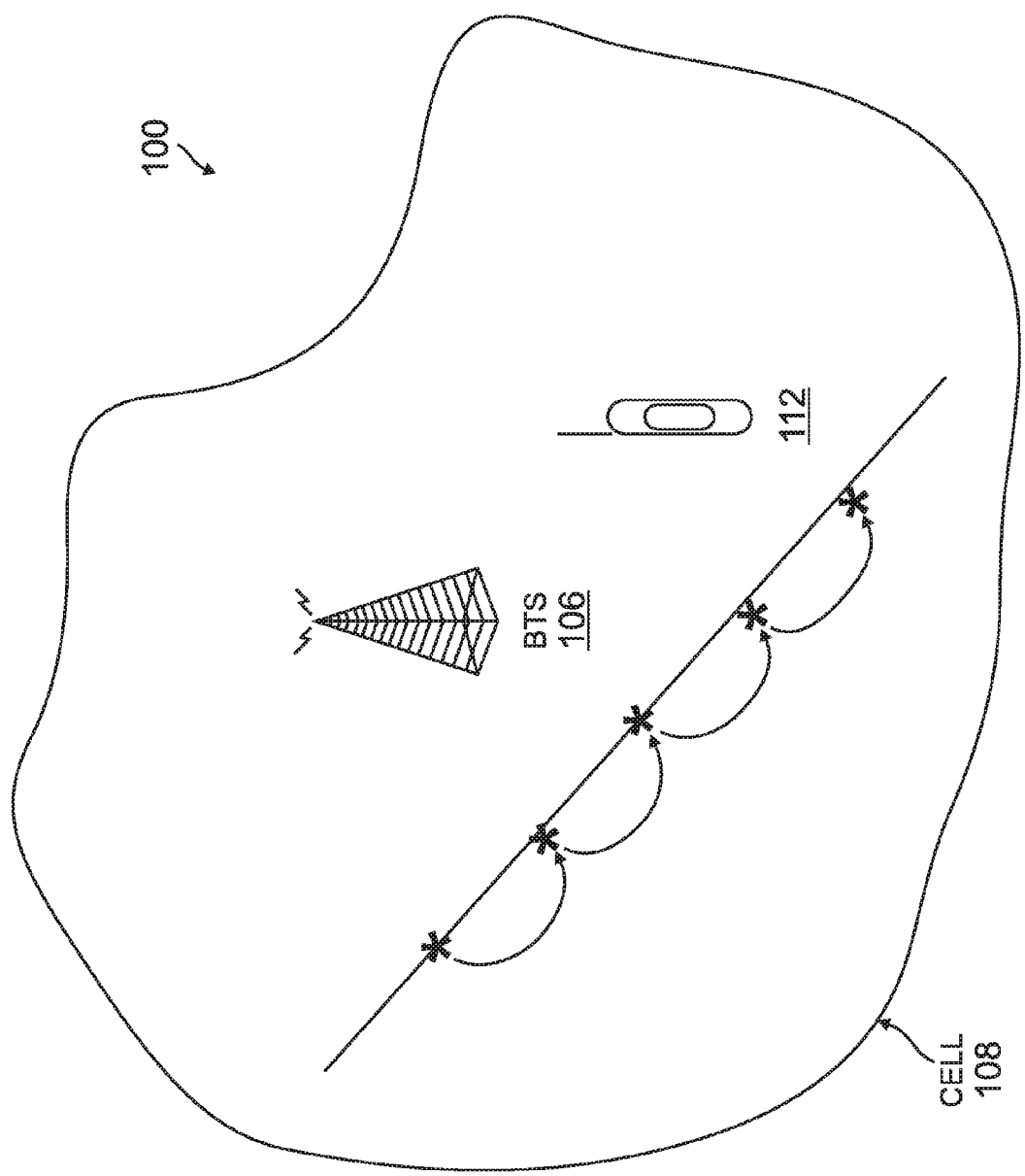
FIG. 4A is a block diagram that illustrates dynamic power allocation according to the preferred embodiment of the present invention.

Consider the example of FIG. 4A, wherein the location, direction, and speed of travel for a mobile transceiver 112 along a path within cell site 108 is available from the E911 location information provided to the Data Collection and Filtering system 114. In this example, the E911 location information indicates the position of the mobile transceiver 112 along the path, as illustrated by the asterisks (*), and the change in position, as illustrated by the arrows.

This information can be used to identify the current location of the mobile transceiver 112, as well as predict the future locations of the mobile transceivers 112. Using the results of the analysis performed on this information by the Data Collection and Filtering system 114, the RF signal power from the BTS's 106 can be dynamically assigned to cells 108, sectors 110A-C within cells 108, and/or individual mobile transceivers 112, by the Network Control system 116.

Note that a power adjustment in a CDMA (Code Division Multiple Access) cellular network 100 is equivalent to a channel assignment in a TDMA (Time Division Multiple Access), AMPS (Advanced Mobile Phone Service), or GSM (Global System for Mobile Communications) cellular networks 100. Similarly, dynamic power allocation in a CDMA cellular network 100 is equivalent to dynamic channel allocation in TDMA, AMPS and GSM cellular networks 100. However, using the location information, as in the present invention, more accuracy can be achieved for such dynamic channel assignment in a CDMA cellular network 100.

Figure 4B:
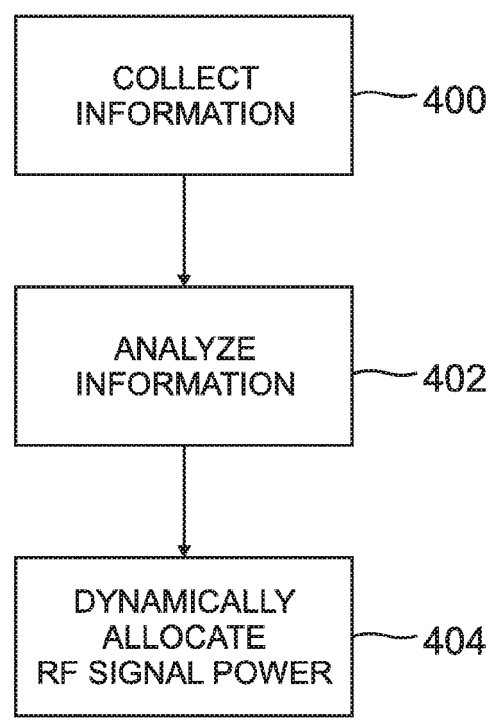
FIG. 4B is a flowchart that illustrates the logic of dynamic power allocation according to the preferred embodiment of the present invention.

FIG. 4B is a flowchart that illustrates the logic of dynamic power allocation according to the preferred embodiment of the present invention. Block 400 represents the Data Collection and Filtering system 114 collecting and filtering information from the network 100, and Block 402 represents the Data Collection and Filtering system 114 analyzing the collected and filtered information from the network 100 in real-time or in an off-line manner. Block 404 represents the Network Control system 116 using the results from the analysis of the collected and filtered information to optimize the operation of the network 100 by dynamically allocate radio frequency (RF) signal power in the network 100, i.e., by dynamically assigning RF signal power to cells 108, sectors 110A-C within cells 108, and mobile transceivers 112 based on the collected and analyzed information.

Dynamic Dedicated Hand Off Thresholds for Individual Mobile Transceivers

Another area of optimization provided by the present invention is dynamic dedicated handoff (HO) thresholds for individual mobile transceivers 112. Using the E911 location information, each mobile transceiver 112 can have a unique, assigned HO (hand off) or SHO (soft hand off) threshold based on the network 100 resources, network 100 capacity, and as well as each subscriber's requirements.

Figure 5A:
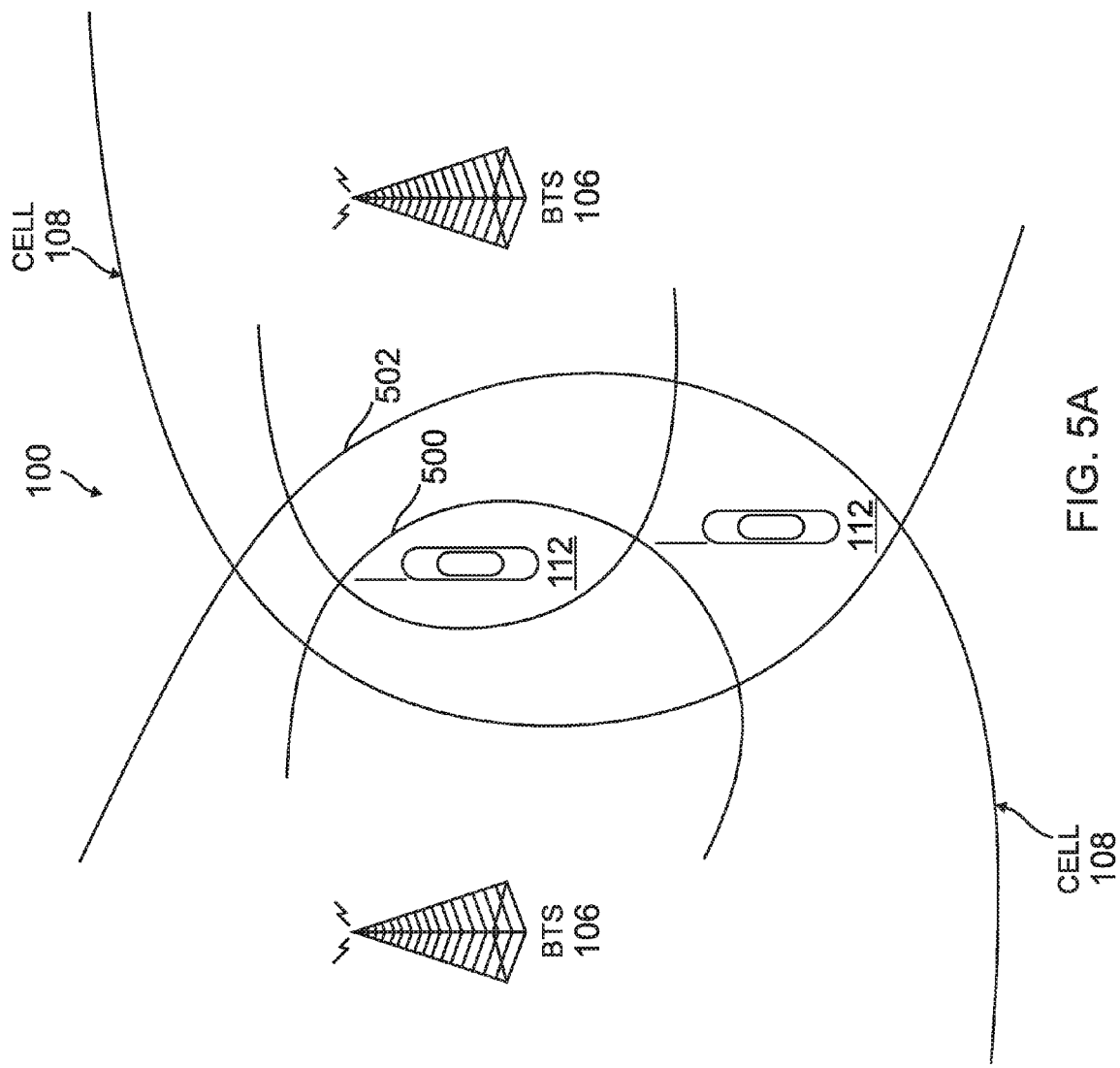
FIG. 5A is a block diagram that illustrates individual and tailored handoff thresholds according to the preferred embodiment of the present invention.

Consider the example of FIG. 5A, which illustrates a tailored and individualized HO/SHO threshold, resulting in a handoff region 500 for a mobile transceiver 112, as compared to a standard HO region 502 used in the prior art. The tailored and individualized HO/SHO thresholds can thus be applied to effectively control each mobile transceiver 112 and optimize the operation of the network 100. This allows for more efficient use of resources in the network 100, as well as helping to control interference within the network 100.

With a dynamic dedicated HO/SHO threshold, the network 100 can control where, when and what components in the network 100 should serve the mobile transceiver 112. In the preferred embodiment, the Network Control system 116 controls HO/SHO between multiple adjacent and non-adjacent cells 108 and sectors 110A-C, instead of the network 100 controlling HO/SHO only between adjacent cells 108 and sectors 110A-C.

For example, mobile transceivers 112 can be offloaded from one cell 108 to other less busy cells 108, through the use of the dynamic dedicated HO threshold, when traffic is high for a given cell 108. Similarly, mobile transceivers 112 with no need for SHO can be transferred between cells 108 very quickly by setting the SHO threshold to be very small.

In contrast to systems that use "hard" handoffs (e.g., GSM, TDMA and AMPS), where the handoff occurs at a specific fixed location, the network 100 of the present invention can use the E911 location information to identify an optimal location for performing a handoff for each mobile transceiver 112, wherein the network 100 decides when a handoff should occur based on the HO threshold as well as the location of the mobile transceiver 112.

Moreover, the collected and analyzed information can be used to optimize the operation of the network 100 based on interference levels, thereby increasing the capacity of the network 100. Thus, when a specific cell 108 is approaching its capacity limits, the network 100 can perform handoffs at a faster rate to adjacent cells 108 or at a slower rate into the congested cell 108.

Figure 5B:
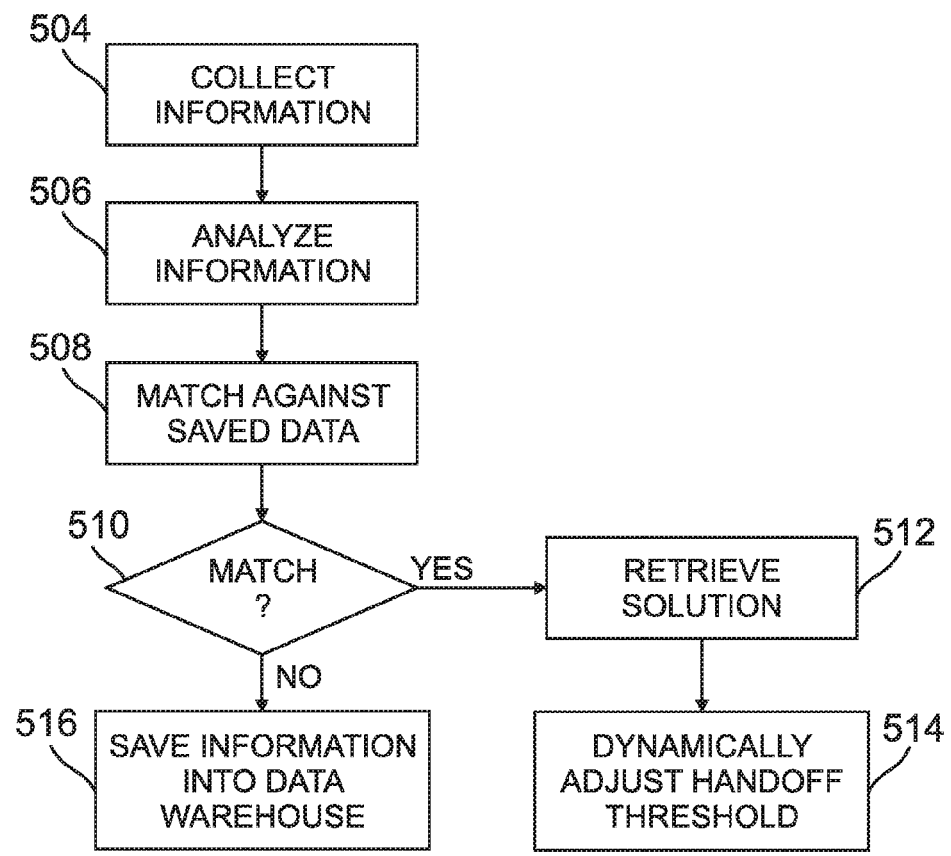
FIG. 5B is a flowchart that illustrates the logic of setting handoff thresholds according to the preferred embodiment of the present invention.

FIG. 5B is a flowchart that illustrates the logic of setting handoff thresholds according to the preferred embodiment of the present invention. Block 504 represents the Data Collection and Filtering system 114 collecting and filtering information from the network 100 and Block 506 represents the Data Collection and Filtering system 114 analyzing the collected and filtered information from the network 100 in real-time or in an off-line manner. Block 508 represents the Data Collection and Filtering system 114 comparing the collected, filtered, and analyzed information against previously-analyzed snapshots stored in the data warehouse 214. Block 510 is a decision block that represents the Data Collection and Filtering system 114 determining whether a match has occurred in the comparison of the collected, filtered, and analyzed information against the previously-analyzed snapshots stored in the data warehouse 214. If so, control transfers to Block 512, which represents the Data Collection and Filtering system 114 retrieving one or more solutions developed for the previously-analyzed snapshots stored in the data warehouse 214, and Block 514, which represents the Network Control system 116 using the solutions to optimize the operation of the network 100 by dynamically adjusting dedicated handoff (HO) thresholds for individual mobile transceivers 112, wherein the individual mobile transceivers 112 each have a unique, assigned HO (hand off) threshold. Otherwise, Block 516 represents the Data Collection and Filtering system 114 saving the collected, filtered, and analyzed information into the data warehouse 214, so that network engineers can further analyze the information using the off-line analysis system 208, and possibly develop solutions associated with the information.

Intelligent Beam Steering and Beam Forming

Yet another area of optimization provided by the present invention is intelligent beam steering and beam forming using the information provided to the Data Collection and Filtering system 114. The Network Control system 116 can intelligently "steer" and/or "form" RF signal beams generated by the BTS's 106 more intelligently, since the location, speed, and direction of the mobile transceivers 112 is available from the E911 information. For example, a "smart" antenna (such as a phased array antenna) can assign power in the direction of one or more mobile transceivers 112 as required.

Figure 6:
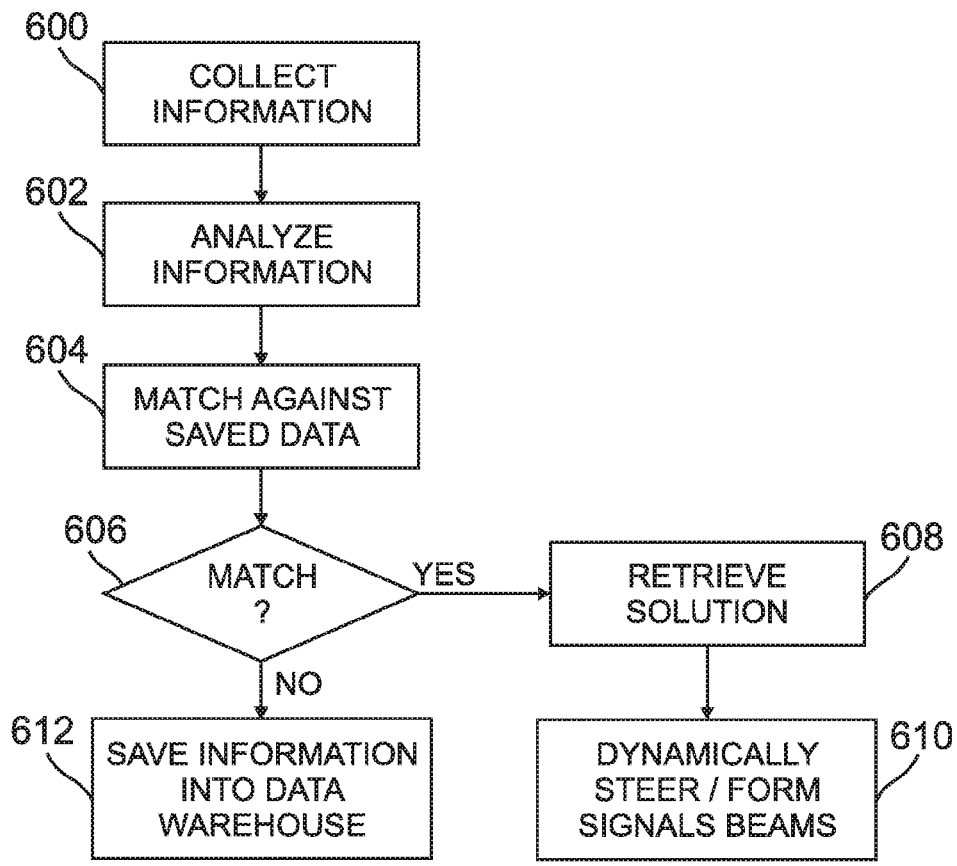
FIG. 6 is a flowchart that illustrates the logic of intelligently beam forming or beam steering according to the preferred embodiment of the present invention.

FIG. 6 is a flowchart that illustrates the logic of setting handoff thresholds according to the preferred embodiment of the present invention. Block 600 represents the Data Collection and Filtering system 114 collecting and filtering information from the network 100 and Block 602 represents the Data Collection and Filtering system 114 analyzing the collected and filtered information from the network 100 in real-time or in an off-line manner. Block 604 represents the Data Collection and Filtering system 114 comparing the collected, filtered, and analyzed information against previously-analyzed snapshots stored in the data warehouse 214. Block 606 is a decision block that represents the Data Collection and Filtering system 114 determining whether a match has occurred in the comparison of the collected, filtered, and analyzed information against the previously-analyzed snapshots stored in the data warehouse 214. If so, control transfers to Block 608, which represents the Data Collection and Filtering system 114 retrieving one or more solutions developed for the previously-analyzed snapshots stored in the data warehouse 214, and Block 610, which represents the Network Control system 116 using the solutions to optimize the operation of the network 100 by intelligently forming radio frequency (RF) signal beams, i.e., by intelligently steering an RF signal beam in the direction of one or more mobile transceivers 112. Otherwise, Block 612 represents the Data Collection and Filtering system 114 saving the collected, filtered, and analyzed information into the data warehouse 214, so that system engineers can further analyze the information using the off-line analysis system 208, and possibly develop solutions associated with the information.

Problem Identification and Resolution

Still another area of optimization provided by the present invention is problem identification and resolution using the information provided to the Data Collection and Filtering system 114. Generally, the information is analyzed to identify problems in the network 100, and correlate those problems with the E911 location information, Hand Off (HO) information, Power information, Measurements, and/or System Parameters. Specifically, the E911 location information can be correlated with the other information, i.e., location information such as latitude, longitude, height, speed, direction of travel, and time of day can be correlated with other information concerning the problem to better diagnose the problems and to help identify possible solutions.

Figure 7:
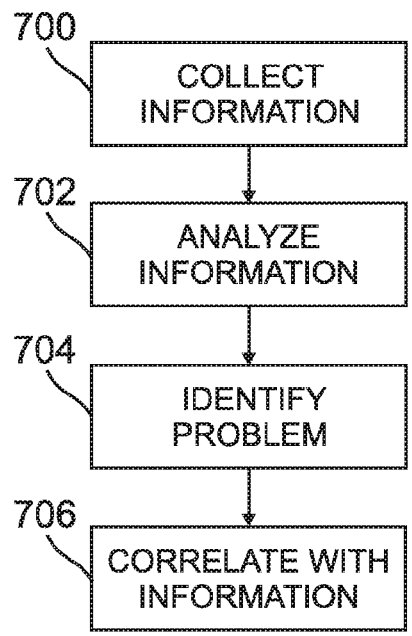
FIG. 7 is a flowchart that illustrates the logic of problem identification and resolution according to the preferred embodiment of the present invention.

FIG. 7 is a flowchart that illustrates the logic of problem identification and resolution according to the preferred embodiment of the present invention. Block 700 represents the Data Collection and Filtering system 114 collecting and filtering information from the network 100, and Block 702 represents the Data Collection and Filtering system 114 analyzing the collected and filtered information from the network 100 in an off-line manner. Block 704 represents the Data Collection and Filtering system 114 using the results from the analysis of the collected and filtered information to identify problems in the operation of the network 100, and Block 706 represents the Data Collection and Filtering system 114 correlating the identified problems with the collected and analyzed information, i.e., correlating the identified problems with mobile transceiver 112 location information.

CONCLUSION

In summary, the present invention discloses a data collection and filtering system interfaces to a wireless network and collects provides various types of information therefrom, including E911 location information, Hand Off (HO) information, Power information, as well as other Signal Measurements and System Parameters. This information is analyzed by the Data Collection and Filtering system and the results of this analysis are provided to a Network Control system to dynamically control the operation of the network. The various optimizations that can be achieved include: (1) dynamically allocating radio frequency (RF) signal power in the network, (2) setting dynamic dedicated handoff (HO) thresholds for individual mobile transceivers; and (3) intelligently forming or steering radio frequency (RF) signal beams. Moreover, the collected and analyzed information can be used to identify and resolve problems in the network, especially when the identified problems are correlating with mobile transceivers location information.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for operating a wireless network, comprising:
   (a) collecting and analyzing information from the wireless network into a collection and analysis system coupled to the wireless network, wherein the information includes location information on a plurality of mobile transceivers communicating with the wireless network and the information is collected when certain defined thresholds are triggered; and
   (b) optimizing the wireless network's operation from a network control system coupled to the wireless network by intelligently steering radio frequency (RF) signal beams transmitted from the wireless network in the direction of one or more of the plurality of mobile transceivers using the collected and analyzed information.

2. The method of claim 1, wherein the location information comprises E911 location information.

3. The method of claim 1, wherein the information further includes one or more types of information selected from a group comprising Hand Off (HO) information, Power information, Measurements, and System Parameters from the wireless network.

4. The method of claim 1, further comprising identifying and resolving problems using the collected and analyzed information.

5. The method of claim 4, wherein the identifying and resolving step further comprises identifying problems in the wireless network, and correlating the identified problems with the collected and analyzed information.

6. The method of claim 5, wherein the correlating step further comprises correlating the identified problems with mobile transceiver location information from the collected and analyzed information.

7. A method for operating a wireless network, comprising:
   (a) collecting and analyzing information from the wireless network into a collection and analysis system coupled to the wireless network, wherein the information includes location information on a plurality of mobile transceivers communicating with the wireless network; and
   (b) optimizing the wireless network's operation from a network control system coupled to the wireless network by intelligently steering radio frequency (RF) signal beams transmitted from the wireless network in the direction of one or more of the plurality of mobile transceivers using the collected and analyzed information, wherein the optimizing step further comprises setting dynamic dedicated handoff (HO) thresholds for individual mobile transceivers based on the collected and analyzed information and the individual mobile transceivers each have a unique, assigned HO threshold.

8. The method of claim 7, wherein the optimizing step further comprises dynamically allocating radio frequency (RF) signal power in the wireless network based on the collected and analyzed information.

9. The method of claim 8, wherein the dynamically allocating step further comprises dynamically assigning RF signal power to cells, sectors within cells, and mobile transceivers based on the collected and analyzed information.

10. The method of claim 7, wherein the optimizing step further comprises performing handoffs for individual mobile transceivers based on their unique, assigned HO (hand off) threshold and their location.

11. The method of claim 10, wherein the performing step comprises performing handoffs for individual mobile transceivers in order to minimize interference levels.

12. The method of claim 7, wherein the intelligently steering step further comprises intelligently forming an RF signal beam based on the collected and analyzed information.

13. A system for operating a wireless communications network, comprising:
   (a) a data collection and filter system, coupled to the wireless communications system, for collecting and analyzing information from the wireless network, wherein the information includes location information on a plurality of mobile transceivers communicating with the wireless network and the information is collected when certain defined thresholds are triggered; and
   (b) a network control system, coupled to the wireless communications system and the data collection and filter system, for optimizing the wireless network's operation by intelligently steering radio frequency (RF) signal beams transmitted from the wireless network in the direction of one or more of the plurality of mobile transceivers using the collected and analyzed information.

14. The system of claim 13, wherein the location information comprises E911 location information.

15. The system of claim 13, wherein the information further includes one or more types of information selected from a group comprising Hand Off (HO) information, Power information, Measurements, and System Parameters from the wireless network.

16. The system of claim 13, wherein the data collection and analysis system further comprises means for identifying and resolving problems using the collected and analyzed information.

17. The system of claim 16, wherein the means for identifying and resolving further comprises means for identifying problems in the wireless network, and correlating the identified problems with the collected and analyzed information.

18. The system of claim 17, wherein the means for correlating further comprises means for correlating the identified problems with mobile transceiver location information from the collected and analyzed information.

19. A system for operating a wireless communications network, comprising:
   (a) a data collection and filter system, coupled to the wireless communications system, for collecting and analyzing information from the wireless network, wherein the information includes location information on a plurality of mobile transceivers communicating with the wireless network; and
   (b) a network control system, coupled to the wireless communications system and the data collection and filter system, for optimizing the wireless network's operation by intelligently steering radio frequency (RF) signal beams transmitted from the wireless network in the direction of one or more of the plurality of mobile transceivers using the collected and analyzed information, wherein the network control further comprises means for setting dynamic dedicated handoff (HO) thresholds for individual mobile transceivers based on the collected and analyzed information and the individual mobile transceivers each have a unique, assigned HO threshold.

20. The system of claim 19, wherein the network control further comprises means for dynamically allocating radio frequency (RF) signal power in the wireless network based on the collected and analyzed information.

21. The system of claim 20, wherein the means for dynamically allocating further comprises means for dynamically assigning RF signal power to cells, sectors within cells, and mobile transceivers based on the collected and analyzed information.

22. The system of claim 19, wherein the network control further comprises means for performing handoffs for individual mobile transceivers based on their unique, assigned HO (hand off) threshold and their location.

23. The system of claim 22, wherein the means for performing comprises means for performing handoffs for individual mobile transceivers in order to minimize interference levels.

24. The system of claim 19, wherein the means for intelligently steering further comprises means for intelligently forming an RF signal beam based on the collected and analyzed information.

* * * * *